Aug. 11, 1959 P. J. DEMARKIS 2,898,957
GUN CHECKERING TOOL
Filed Jan. 29, 1958

INVENTOR.
Peter J. Demarkis
BY
*[signature]*
ATTORNEY 2,898,957
Patented Aug. 11, 1959

2,898,957
GUN CHECKERING TOOL
Peter J. Demarkis, Manchester, Mass.

Application January 29, 1958, Serial No. 711,841

6 Claims. (Cl. 144—136)

This invention relates to a gun stock checkering tool of the power driven class which includes a rotary cutting blade and spindle together with a flexible driving shaft designed to provide for carrying out a manual checkering operation. More particularly, the invention is concerned with a cutting guide attachment which may be removably secured to the spindle holding chuck of a flexible driving shaft of the form indicated above.

It is a principal object of the invention to provide a guide attachment for a rotary type checkering tool of novel character and by means of which a highly precise cutting or checkering operation may be carried out in an exceedingly rapid manner with little opportunity for mistake or faulty working of a gun stock surface irrespective of the type of wood used in the gun stock or the manner in which the wood grain may occur.

Another object is to devise in a manual checkering tool of the general character indicated, an arrangement of rotary cutter and guide components combined in a unique manner whereby the entire checkering operation is not only simplified and expedited but the cutting tool may be instantly shifted from one guide cutting position to a second predetermined guided cutting position and thereafter shifted back to the original starting position in rapid succession without loss of precise register for "skip checkering."

Still another object of the invention is to provide a guide attachment which will control the depth of cut of a rotary cutting tool, which is of rugged construction capable of being cheaply manufactured and which is relatively simple to install on a driving head of a flexible shaft unit.

These and other objects and novel features will be more fully understood and appreciated from the following description of a preferred embodiment of the invention selected for purposes of illustration and shown in the accompanying drawings in which.

Figure 1:
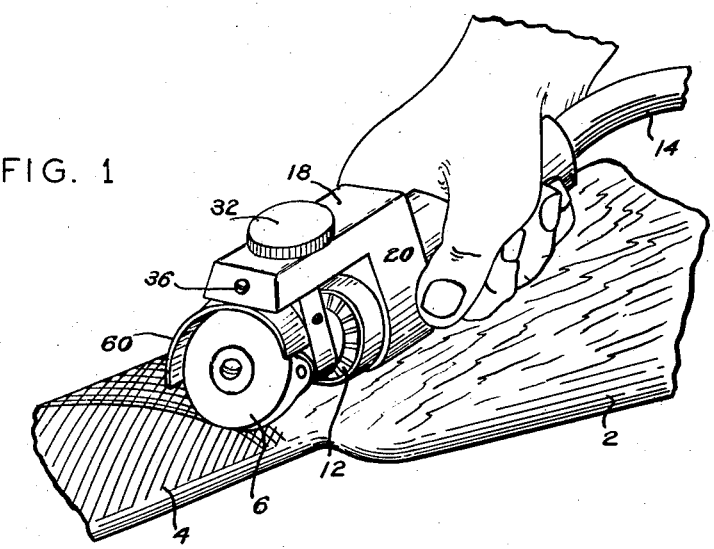
Fig. 1 is a perspective view illustrating diagrammatically the guide attachment of the invention associated with a flexible driving shaft and chuck and supported in an operative position for carrying out a checkering operation on a gun stock surface.
Figure 2:
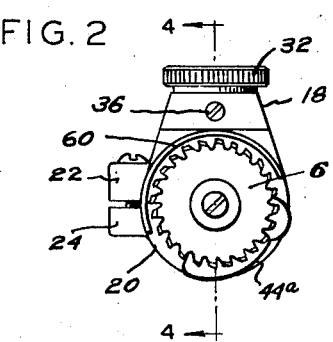
Fig. 2 is an elevational view illustrating the front end of the cutting tool in a fully assembled state.

Referring more in detail to the structure shown in the drawings, numeral 2 denotes a gun stock on the surface of which are indicated lines of checkering 4. A cutter tool of rotary type is indicated at 6 which is supported on a spindle 8 in turn secured in a chuck 10 of a driver head 12. The driver head 12 is actuated through a flexible drive shaft 14 of conventional construction.

In accordance with the invention, I provide a guide mechanism for attachment about the driver head 12, consisting essentially of an elongated holder body 18. At one end of this holder body is a split clamping ring 20 which is preferably constructed as an integral part of the holder body 18 but may, if desired, be separately formed and attached. This clamping ring 20 is further formed with a pair of lug portions 22 and 24 through which are received a fastening screw 26. By slipping the clamping ring 20 on over the driver head 12 of the flexible drive shaft and tightening the screw 26 on the lugs 22 and 24, it will readily be seen that the holder body may be solidly secured in the position shown in Figs. 1 and 3.

An important feature of the elongated holder body 18 is the provision of means for slidably supporting therein a guide element for movement in either of two opposite directions which are parallel to the axis of rotation of the spindle 8.

I accomplish this by forming the elongated holder body with a slideway 28 in which is slidably mounted a guide block 30. Threaded into the guide block is a locking screw 32 which also passes through a slot 34 formed in an adjacent section of the elongated holder body. When the locking screw 32 is released, the guide block may be moved forwardly or backwardly into any desired position and solidly secured by tightening the screw 32.

Figure 3:
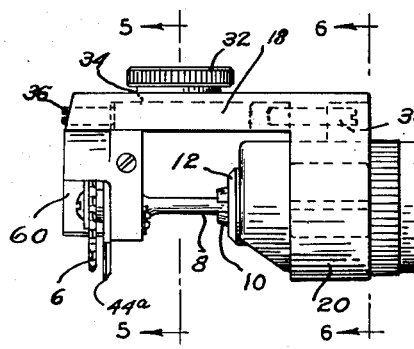
Fig. 3 is a side elevational view showing the cutting guide element in a lowered position normally assumed when the apparatus is not in contact with the surface of a gun stock.
Figure 4:
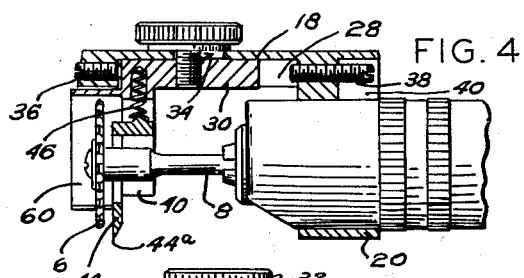
Fig. 4 is a cross-section taken on the line 4—4 of Fig. 2.

For the purpose of limiting the travel of the guide block 30, I further provide two threaded stop members, one of which 36 is shown in Fig. 3 at the outer end of the elongated way portion and also shown more clearly in Fig. 4. The other threaded stop is denoted by numeral 38. Stop 36 is readily accessible as it may project from the outer extremity of the elongated holder body. Stop 38 is rendered accessible by recessing a rear section of the elongated body 18, as may be seen from an inspection of Figs. 4 and 6. It will be apparent that by suitably adjusting the stops 36 and 38 in their respective threaded openings, the travel of the guide block 30 may be limited, as desired, in either direction.

Rigidly secured to the outer ends of the guide block 30, as viewed in Figs. 3 and 4, is a special guide supporting structure consisting preferably of a pair of right-angularly projecting arms 40 and 42. In one of these arms 40 is pivotally mounted the special cutter guide element 44 of the invention which is resiliently urged outwardly by means of a coiled spring 46 seated in a small recessed area in the guide supporting structure as suggested, for example, in Figs. 4 and 5. The guide element 44 is formed with an arcuate bevelled edge 44a.

An important feature of this resiliently mounted guide element 44 is the provision of means for precisely limiting its arc of displacement against the resistance of the spring 46.

Figure 5:
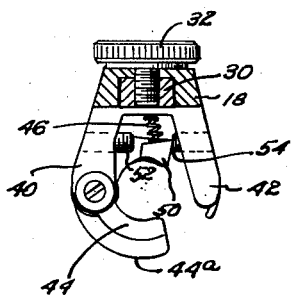
Fig. 5 is a cross-section taken on the line 5—5 of Fig. 3.
Figure 6:
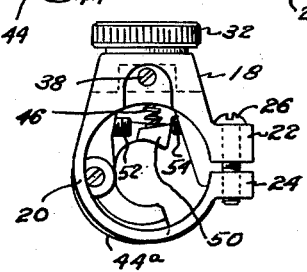
Fig. 6 is an elevational view taken approximately on the line 6—6 of Fig. 3, with the clamping ring shown removed from the driving head portion of the checkering tool.

The guide element 44 is specially formed with a raised extremity 50 which, in the innermost retracted position of the guide element, comes to rest against a threaded stop 52 located through the arm 40. In its extended position, the guide element 44, through its raised extremity 50, likewise comes to rest against a second threaded stop 54 located through the opposite arm 42 as shown in Figs. 5 and 6.

It will be observed that by suitably adjusting the setting of the stop 54, therefore, the arcuate edge 44a of the guide element 44 may be located by spring 46 in a position to project slightly beyond the radius of the circle of the cutting element 6 when not in contact with a work surface as shown in Fig. 4.

It will be further apparent that by adjusting the stop 52 suitably, the edge 44a of the guide element 44 may be caused to lie in a circle of the same radius as the radius of the circle of the cutter element 6 and thus may guide and limit the depth of a cut made at any time. It will be appreciated that by means of the several adjustments described above the cutter guide element can be set to provide any desired cutting depth of the checkering line. Thereafter the guide may be shifted back and forth in the slideway as determined by the slide stop settings to provide for successive cutting steps at different spacings of lines which can be repeated as desired in a highly accurate manner to carry out "skip type checkering."

A further feature in the guide supporting structure is a semi-annular guard 60 which may comprise an extension of this structure and which is designed to extend in spaced relation around the cutter blade 6 as shown in the drawings and thus protect the operator against possible injury.

In operation, the guide attachment of the invention is securely fastened to a flexible shaft driver; thereafter, a starting line or cut which defines the design of checkering to be produced is formed in the surface of the gun stock. The guide element is then engaged in this line and the cutter element is drawn across an adjacent surface of the gun stock to produce a second checkering line. This may be repeated as desired until the complete design has been produced.

From the foregoing description it will be evident that I have described a novel and useful guide attachment of simplified construction that is conveniently applied to a flexible shaft driver. It will also be seen that a plurality of novel and guide settings may be accomplished with precise repetition of cutting to greatly facilitate a gun checkering operation.

While I have shown a preferred embodiment of the invention, it should be understood that various changes and modifications may be resorted to within the scope of the appended claims.

Having thus described my invention what I claim is:

1. An article of the class described comprising an elongated holder body, a split clamping ring secured in a right-angularly disposed position at one end of the elongated holder body, said holder body being recessed at one side to present a slideway, guide mechanism slidably supported in the guideway, stop means for limiting adjusting movement of the guide mechanism in the slideway in one direction and locking screw means for tightly securing the guide means in fixed relationship to the elongated holder body.

2. A structure according to claim 1 including a cutter guard rigidly attached at one side of the guide means.

3. A gun checkering guide attachment for a rotary cutting tool of the class having a spindle secured in the driving head of a flexible shaft, said attachment comprising an elongated holder body recessed along one side to form a slideway, a guide support block slidably disposed in the slideway, a guide element pivotally mounted in the guide support block and means for clamping the elongated holder body to the driving head of the said rotary cutting tool to locate the guide element around the cutting tool blade.

4. An article of the class described comprising an elongated holder body, a split clamping ring secured in a right angularly disposed position at one end of the elongated body, guide means adjustably supported in the elongated body at the opposite end thereof, and said guide means comprising a pair of projecting spaced apart arms and a pivoted guide element supported in one of the arms.

5. An article of the class described comprising an elongated holder body, a split clamping ring secured in a right angularly disposed position at one end of the elongated body, guide means adjustably supported in the elongated body at the opposite end thereof, said guide means including a pair of pivoted arms, a guide element pivotally mounted on one of the arms, spring means for normally urging the guide into an extended position, and stop means for limiting retracted travel of the guide when placed in contact with a gun stock surface.

6. An article of the class described comprising an elongated holder body, a split clamping ring secured in a right angularly disposed position at one end of the elongated body, guide means adjustably supported in the elongated body at the opposite end thereof, said guide means including a pair of pivoted arms, a guide element pivotally mounted on one of the arms, spring means for normally urging the guide into an extended position, stop means for limiting retracted travel of the guide when placed in contact with a gun stock surface, and said guide element presenting a beveled arcuate engaging edge.

References Cited in the file of this patent

UNITED STATES PATENTS

| | | |
|---|---|---|
| 692,028 | Page | Jan. 28, 1902 |
| 1,708,345 | Wodack | Apr. 9, 1929 |
| 1,780,174 | Crowe | Nov. 4, 1930 |
| 2,238,304 | Belanger | Apr. 15, 1941 |
| 2,741,282 | Wieting | Apr. 10, 1956 |

FOREIGN PATENTS

| | | |
|---|---|---|
| 518,038 | Great Britain | Feb. 15, 1940 |